Fig. 5 (A)
Fig. 5 (B)
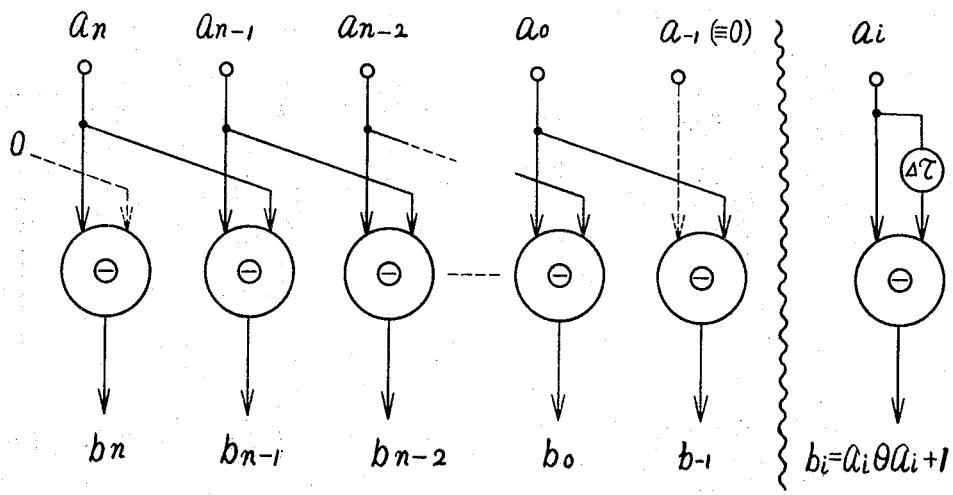
Delay circuit
$b_i = a_i \theta a_{i+1}$
Fig. 6
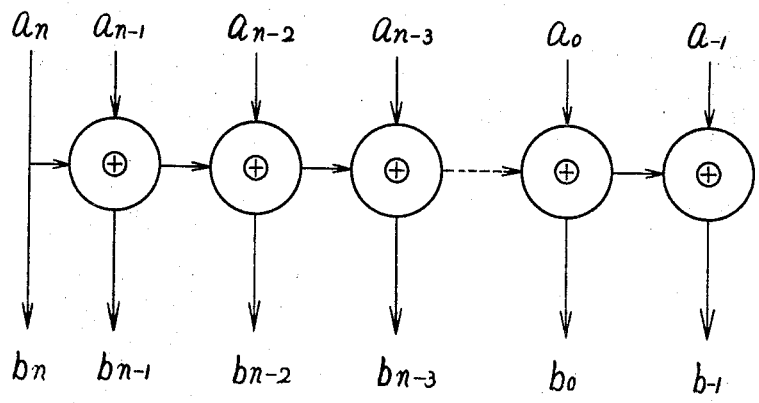
P-adic

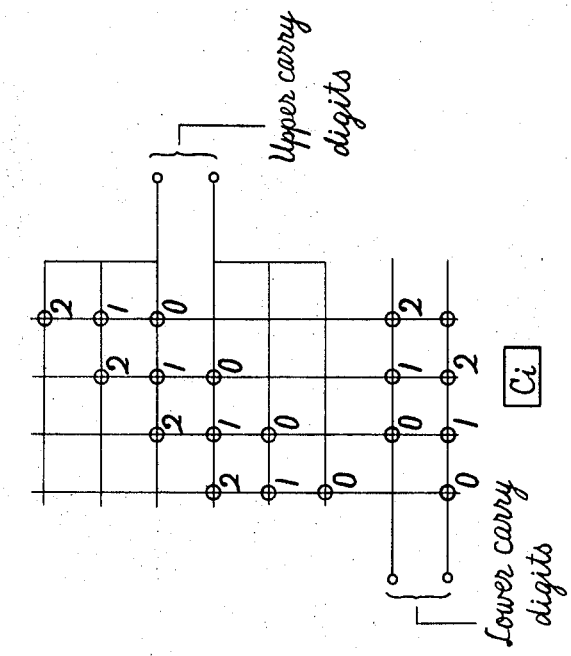
Fig. 7
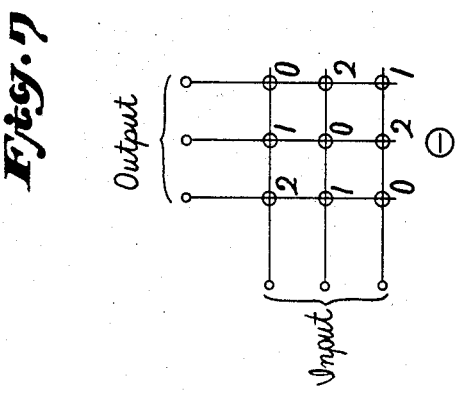
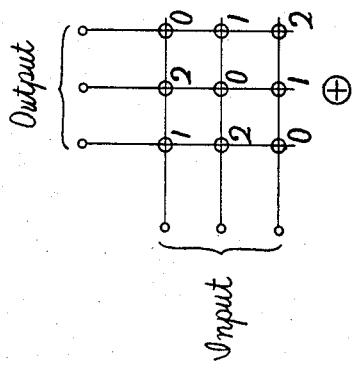
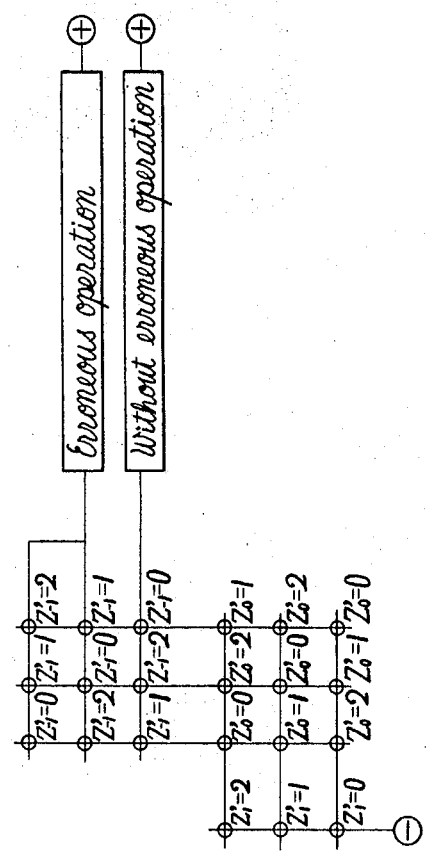
Fig. 9

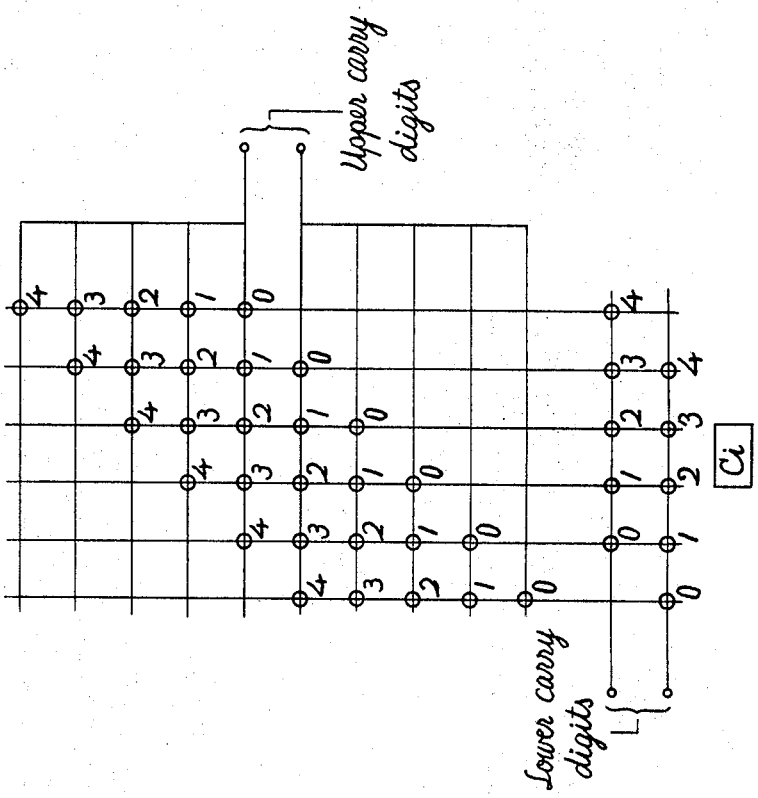
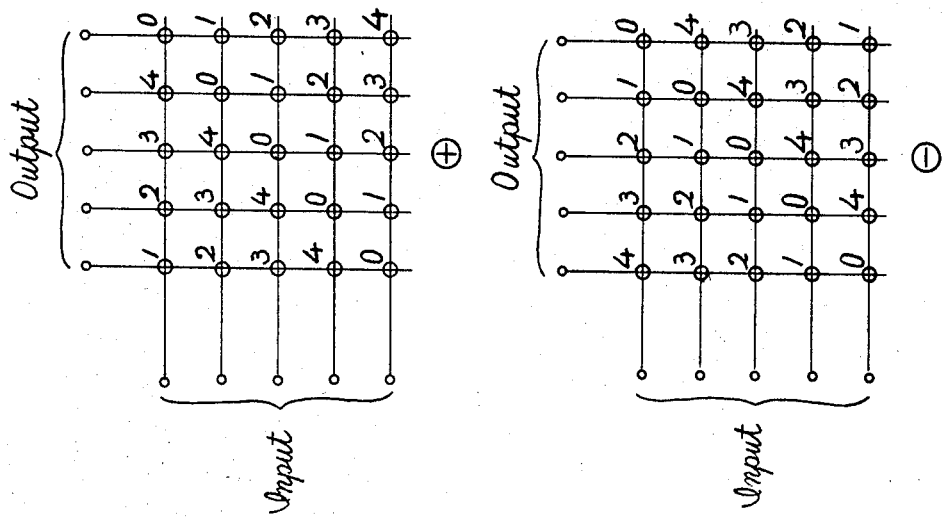

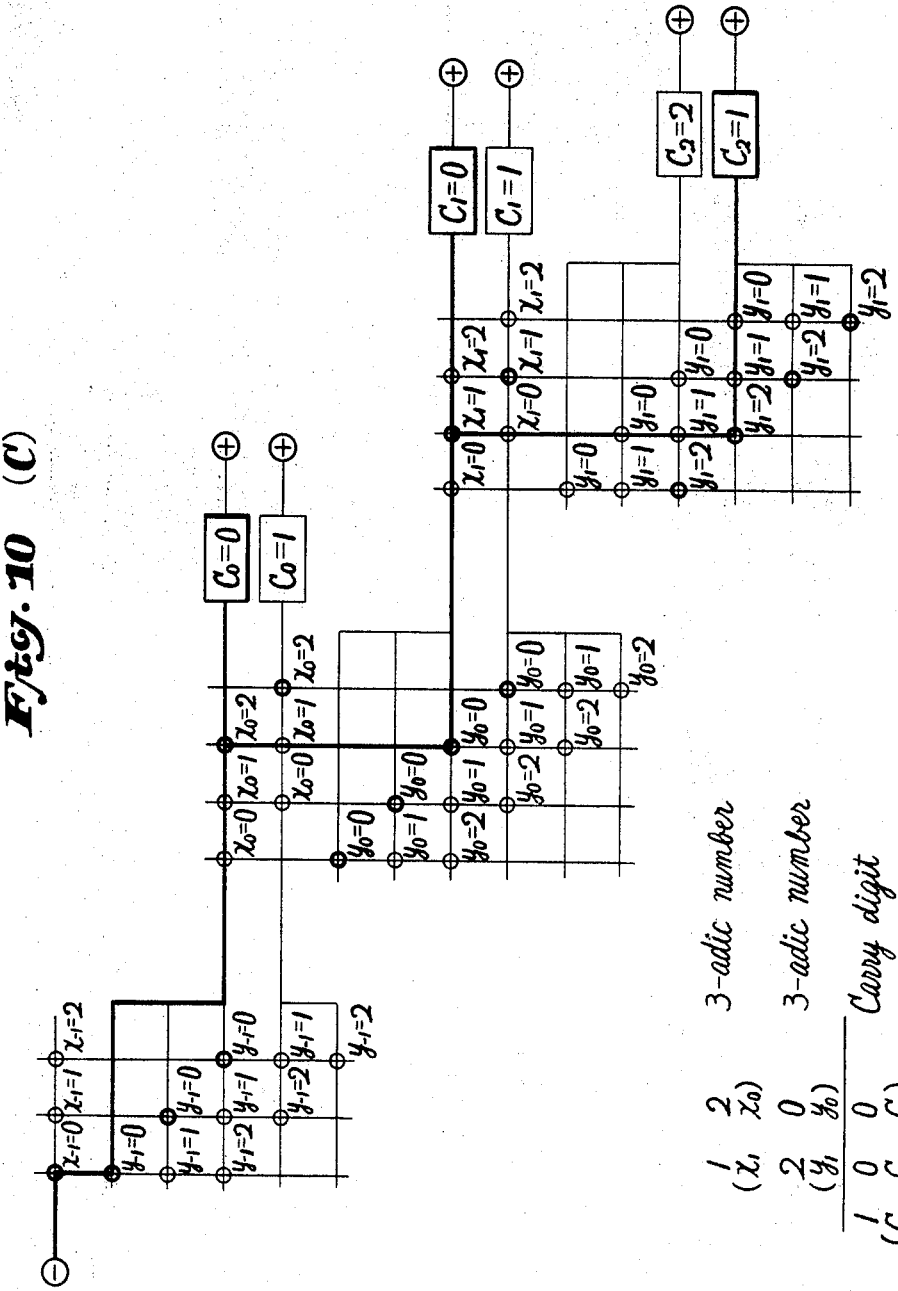

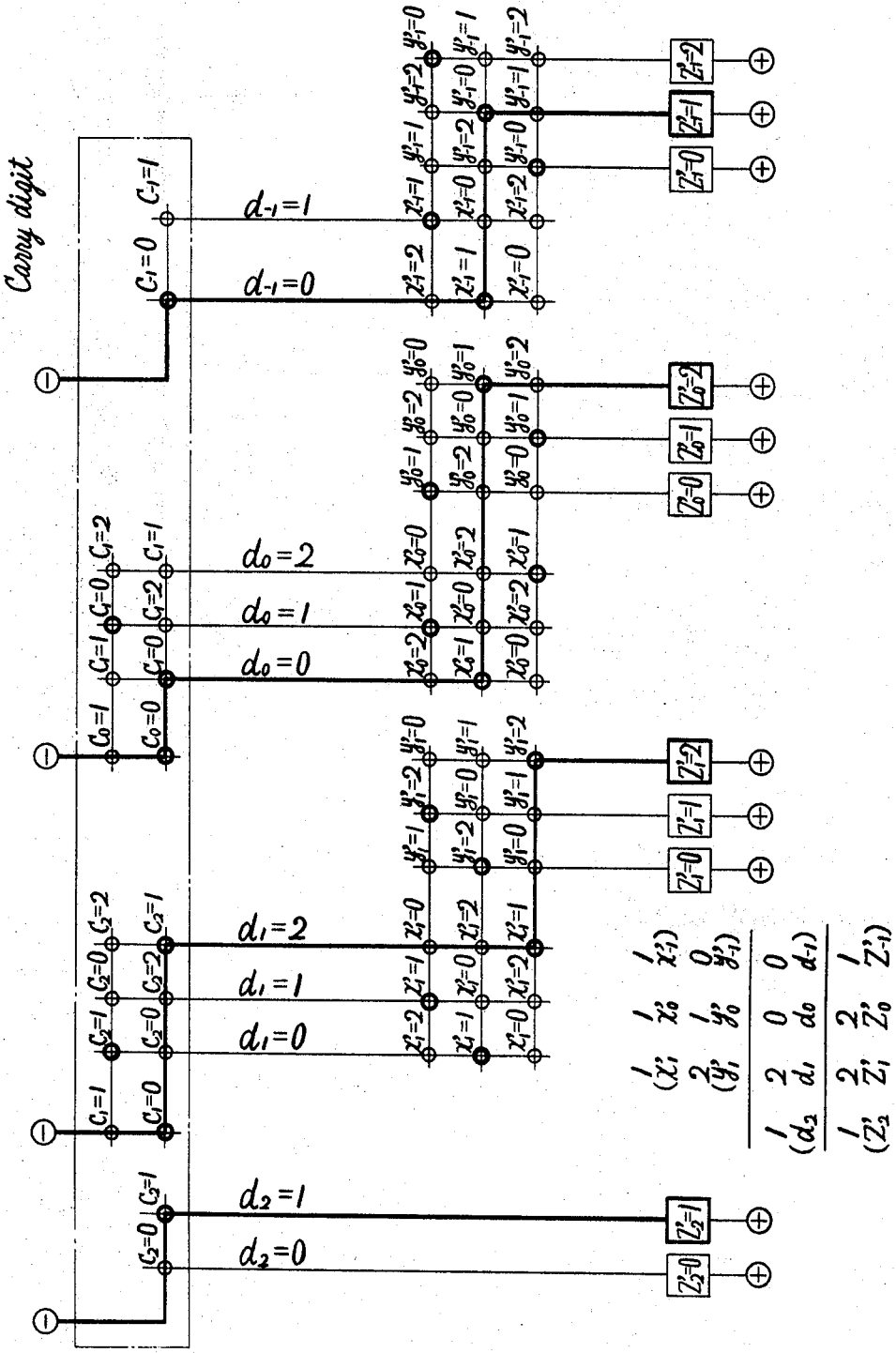

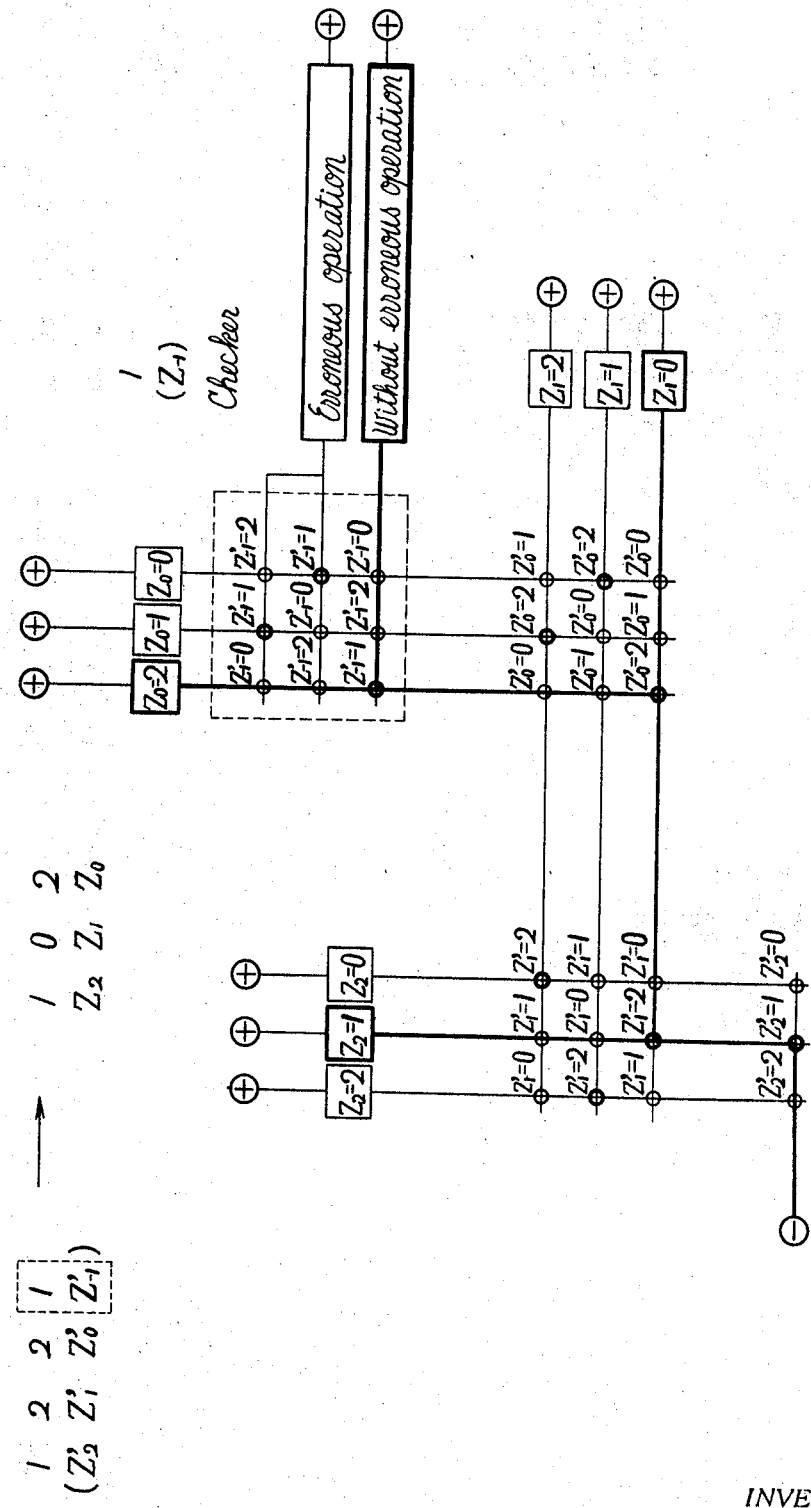

3,538,314
SYSTEM OF CONVERSION AND COMPUTING CIRCUITS BASED ON THE CONSTANT-SUM UNIMODULAR P-ADIC NUMBER
Ryota Suekane, Tokyo, Japan, assignor to Agency of Industrial Science & Technology, Chiyoda-ku, Tokyo, Japan
Continuation-in-part of application Ser. No. 449,714, Apr. 21, 1965. This application Apr. 22, 1969, Ser. No. 818,224
Claims priority, application Japan, Apr. 27, 1964, 39/23,611
Int. Cl. G06f *11/10;* H03k *13/34*
U.S. Cl. 235—153                                    5 Claims

ABSTRACT OF THE DISCLOSURE

The present invention relates to a system containing circuits for converting a conventional p-adic number to a novel constant-sum unimodular p-adic number, circuits for converting a constant-sum unimodular p-adic number to an ordinary p-adic number and circuits for the addition of constant-sum unimodular p-adic numbers, thereby enabling the integration of the adder and checker.

---

This is a continuation-in-part of my copending application Ser. No. 449,714, filed Apr. 21, 1965, now abandoned.

The present invention relates to a system of conversion and computing circuits based on a "constant-sum" unimodular p-adic number which is converted from a conventional p-adic number used in digital computers and information processing devices. More particularly, this invention relates to a system containing circuits for converting a conventional p-adic number to a novel constant-sum unimodular p-adic number, circuits for converting a constant-sum unimodular p-adic number to an ordinary p-adic number and circuits for the addition of constant-sum unimodular p-adic numbers, thereby enabling the integration of the adder and checker.

The term "p-adic" is herein defined to be the number sysetm with the base p, i.e., "2-adic" is the binary system; "3-acidic" is the ternary system; "10-acidic" is the decimal system; etc.

In the conventional information processing device, especially in the digital computer, the applicable number codes have been limited since the conventional number codes are basically constructed on the ordinary p-adic number code. Accordingly, in the conventional system, for example, the computer control of a plant, a necessary information processing according to the conventional system was obtained by the calculation of the p-adic number converted from a binary unit distance code corresponding to the analogue quantity detected in the respective points in the plant.

The applicable unit distance code for the above system is limited to the Gray code, and any other codes could not be applied to date. A block diagram of a prior art conventional system is shown in FIG. 1 in which a digitized analogue quantity detected from the plant is transmitted into a computing circuit. An error detection of the conventional computing circuit in this information processing device is constructed with three circuits. One circuit is a computing circuit operating on numerical values in conventional binary numbers and it computes the error detecting parity digit Q to be attached to the number which represents the output value being computed from input digits. Another circuit compares error detecting digit P to be attached to the aforementioned output value with Q. An error in the computation is detected when P and Q do not coincide. Another means of error detecting of computing circuits is performed by operating more than two identical computers or by operating the computer repeatedly, however, both systems are uneconomical.

It is one object of the present invention to provide a conversion circuit and a computing circuit which is not only capable of detecting errors from the constant-sum of the output value without especially attaching any other additional circuit as used in the conventional method but also which is able to use various codes other than the p-adic number without employing a usual code of the p-adic number but using the constant-sum unimodular p-adic system. With the above and other objects in view which will become apparent in the following detailed description, the present invention will be clearly understood in connection with the accompanying drawings, in which:

FIG. 5 is a symbolically represented example of the p-adic number to constant-sum cyclic p-adic number converter in FIGS. 3 or 4, in which FIG. 5(A) shows a parallel conversion circuit and FIG. 5(B) shows a series conversion circuit;

FIG. 6 is symbolically represented constant-sum cyclic p-adic number to ordinary p-adic number converter in FIGS. 3 and 4;

FIG. 7 shows the contact matrix circuit for each of the symbolic circuit components of the 3-adic system (ternary system);

FIG. 8 shows the same circuit as FIG. 7 for the 5-adic system (quinary system);

FIG. 9 shows an embodiment of the present detection circuit for a system using 3-adic number of three digits.

Figure 1:
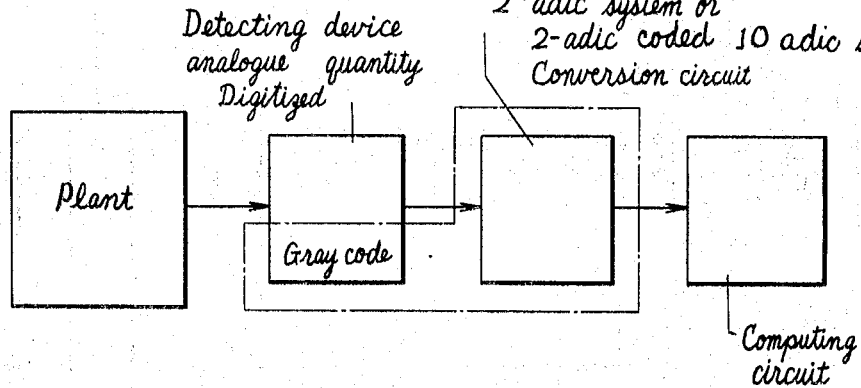
FIG. 1 is a conventional computer control system for a plant wherein the analogue value detected by a detector as a value to be controlled is digitalized and the digital value is treated in an electronic computer.

Returning now to the drawings, FIG. 1 is a conventional computer control system for a plant and when the system of the present invention is employed in this typical computer control system the circuit portion encircled by the dotted line can be deleted.

Figure 2:
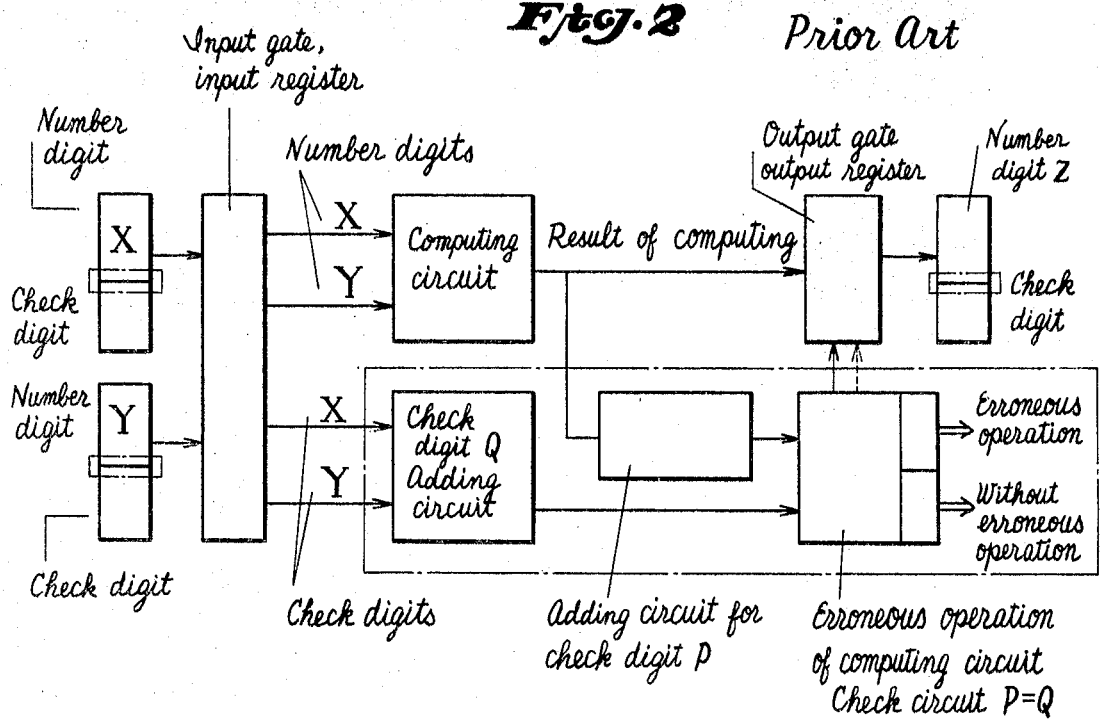
FIG. 2 is the conventional error check system for an operation circuit (adder circuit) of a computer.

FIG. 2 shows the conventional system of an electronic computer and as mentioned above the error detection circuit of this computer enclosed by the dotted line can also be deleted by applying the system of the present invention.

In order to facilitate the present invention, it will be described with respect to the mathematical theory of the constant-sum which is one of the essential features of the constant-sum p-adic number and the mutal relation between the conventional p-adic numbers and the present constant-sum unimodular p-adic numbers.

When an aribitrary number N is to be symbolized by an ordinary p-adic number system, the following polynomial expansion is used with coefficients of N in $p$:

$$N = A_n P^n + A_{n-1} P^{n-1} + \ldots + A_1 P^1 + A_0 \quad (1)$$

and the number is arranged in descending order, i.e, $$(A_n, A_{n-1} \ldots A_1, A_0) \quad (2)$$

and is used, where, $A_n, A_{n-1} \ldots A_1, A_0$ are integers modulo $p$, that is to say, are p-type numbers represented by the integers from 0 to $p_{-1}$, i.e. $0 \sim p_{-1}$. Now, suppose the vector, $$(b_0, b_{n-1} \ldots, b, b_0, b_{-1}) \quad (3)$$

is obtained from the linear transformation, on the integer modulo $p$ to which a constant digit $a_{-1}$ representing a constant number equal to any integral number $0 \sim p_{-1}$) is attached or added to the right side of the ordered group of (2), i.e., at the right side of $a_0$, through $$a(n+2)x(n+2)$$

unimodular matrix (whose determinant is $\pm 1$).

$$\begin{array}{cccc} A_{0,n} & A_{n,n-1} & \ldots, & A_{0,0}, A_{n,-1} \\ A_{n-1,n} & A_{n-1,n-1} & \ldots, & A_{n-1,0}, A_{n-1,-1} \\ \cdot & \cdot & & \cdot \\ A_{0,n} & A_{0,n-1} & \ldots, & A_0, A_{0,-1} \\ A_{-1,n} & A_{-1,n-1} & \ldots & A_{-1,0}, A_{-1,-1} \end{array} \quad (5)$$

to a vector $$(A_n, A_{n-1} \ldots A_1, A_0, A_{-1}) \quad (4)$$

Thus, the representation by the constant-sum unimodular p-adic number corresponding to p-adic number, which represents number N, is obtained as Formula 3.

Now supposing the computation to obtain each component of the vector of the Formula 3; through matrix (5) from (4), is performed on the integer modulo $p$, values of respectibe $b_i$ are obtained by the formula as $$b_n = A_n \cdot A_{n,n} + A_{n-1} A_{n,n-1} + \ldots + A_0 A_{n,0} + A_{-1} A_{n,-1}$$
$$b_{n-1} = A_n A_{n-1,n} + A_{n-1} A_{n-1,n-1} +$$
$$\ldots + A_0 A_{n-1,0} + A_{-1} A_{n-1,-1}$$
$$(6)$$
$$b_0 = A_n A_{0,n} + A_{n-1} A_{0,n-1} + \ldots + A_0 A_{0,0} + A_{-1} A_{0,-1}$$
$$b_{-1} = A_n A_{-1,n} + A_{n-1} A_{-1n} + \ldots + A_0 A_{-1,0} + A_{-1} A_{-1,-1}$$

Since the unimodular matrix usually retains the corresponding inverse matrix, the constant-sum unimodular p-adic number which represents the number N may be converted into the p-adic number (4) which represents the number N by application of the inverse unimodular matrix, $$\begin{array}{cccc} A'_{n,n} & A'_{n,n-1} & \ldots & A'_{n,0} \; A'_{n,-1} \\ A'_{n-1,n} & A'_{n-1,n-1} & \ldots & A'_{n-1,0} \; A'_{n-1,-1} \\ A'_{1,n} & A'_{0,n-1} & \ldots & A'_{0,0} \; A'_{0,-1} \\ A'_{-1n} & A'_{-1n-1} & \ldots & A'_{-1,0} \; A'_{-1,-1} \end{array} \quad (7)$$

Each component of vector (4) can be represented by components involved in vector (3) and matrix (7).

Thus, individual values of $A_i$ can be obtained from the following formulas:

$$A_n = b_n \cdot A'_{n,n} + b_{n-1} \cdot A'_{n,n-1} + \ldots + b_0 A'_{n,0} + b_{-1} \cdot A'_{n,-1}$$
$$A_{n-1} = b_n \cdot A'_{n-1,n} + b_{n-1} \cdot A'_{n-1,n-1} +$$
$$\ldots + b_0 A'_{n-1,0} + b_{-1} A'_{n-1,-1}$$
$$(8)$$
$$A_0 = b_n A'_{0,n} + b_{n-1} \cdot A'_{0,n-1} + \ldots + b_0 A'_{0,0} + b_{-1} A'_{0,-1}$$
$$A_{-1} = b_n A'_{-1,n} + b_{n-1} A'_{-1,n-1} +$$
$$\ldots + b_0 A'_{-,0} + b_{-1} A'_{-1,-1}$$

The value $A_{-1}$ at the right side of $A_0$ in (4) is set beforehand in to be equal to the number of any of the integral number $0 \sim p_{-1}$; thus, the weighted sum modulo $p$ of each digit $b_n, b_{n-1} \ldots b_1, b_0, b_{-1}$ of the constant-sum unimodular p-adic number maintains the constant value, which is the same value as the value $A_{-1}$ set beforehand.

The aforementioned description is an explanation of the constant-sum of the present constant-sum unimodular p-adic number which represents the number N which is the basic constituents of both the conversion circuit and computing circuit of the present invention.

Particularly, the present invention as described above is fundamentally featured that the present constant-sum established for the arithmetic operation is not only limited to one supplemental digit, but also effective to a plurality of supplemental digits.

An adding operation of the constant-sum unimodular p-adic number which constitutes an essential part of the computing circuit based on the constant-sum unimodular p-adic number of the present invention will be described.

Let two numbers be X, Y, the sum of which is Z (hereinafter referred to as "output" or "response"), and to their representation in p-adic number is added or attached the constant-sum digit, $x_{-1}$, $y_{-1}$, and $z_{-1}$ to the right side of $x_0, y_0$ and $z_0$ as below, $$X = (x_n, x_{n-1} \ldots x_1, x_0, x_{-1}) \quad (9)$$
$$Y = (y_n, y_{n-1} \ldots y_1, y_0, y_{-1}) \quad (10)$$
$$Z = (z_{n+1}, z_n, z_{n-1} \ldots z_1, z_0, z_{-1}) \quad (11)$$

and also the representation of these p-adic numbers are constant-sum unimodular p-adic number, $$X' = (x'_n, x'_{n-1} \ldots x'_1, x'_0 \, x'_{-1}) \quad (9')$$
$$Y' = (y'_n, y'_{n-1} \ldots y'_1, y'_0, y'_{-1}) \quad (10')$$
$$Z' = z'_{n+1}, z'_n, z'_{n-1} \ldots z'_1, z'_0, z'_{-1}) \quad (11')$$

Then, $XX'$, $YY'$ and $ZZ'$ correspond with the same value respectively. Accordingly, if the value of the number represented by the aforesaid code was formulated with a notation such as $| \; |$ they can be indicated by $$|X| = |X'|, \; |Y| = |Y'|, \; |Z| = |Z'| \quad (12)$$

Nevertheless, indications thereof may be different, and the mutual relation thereof is respectively connected by an identical linear transformation represented by the unimoduler matrix (5).

Now, if a systematic addition for obtaining the sum Z adding X with Z operated by an ordinary method is written down by p-adic number system with the exception of the constant digital portion, $$\begin{array}{r} x_n x_{n-1} \ldots x_1 x_0 \ldots \text{Augend X} \\ + \; \underline{y_n y_{n-1} \ldots y_1 y_0 \ldots \text{Adder Y}} \\ C_n C_{n-1} \ldots C_1 C_0 \ldots \text{Carry C} \\ Z_{n+1} Z_n Z_{n-1} \ldots Z_1 Z_0 \ldots \text{Sum Z} \end{array} \quad (13)$$

will be established.

But $Z_i$ in the $i_{\text{th}}$ digit of the sum Z is the sum modulo $p$ of the three digits $x_i$ and $y_i$ in the $i_{\text{th}}$ digit appeared in the augend and the addend together with $C_{i-1}$ carried from the neighbouring lower digital position being represented by $$Z_i = X_i + Y_i + C_{i-1} \; (\text{Modulo } p) \quad (14)$$

The systematic addition of the constant-sum unimodular p-adic number corresponding to the Formula 13

$$\begin{array}{r} x'_n x'_{n-1} \ldots x'_1 x'_0 x'_{-1} \ldots \text{Augend X'} \\ + \; \underline{y'_n y'_{n-1} \ldots y'_1 y'_0 y'_{-1} \ldots \text{Adder Y'}} \\ d_n d_{n-1} \ldots d_1 d_0 d_{-1} \ldots \text{Carry D} \\ Z'_{n+1} Z'_0 Z'_{n-1} \ldots Z'_1 Z'_0 Z'_{-1} \ldots \text{Sum Z'} \end{array} \quad (15)$$

is established.

In this case, the carry vector of the Formula 15 in the constant-sum unimodular p-adic number $$d_n, d_{n-1} \ldots d_1, d_0, d_{-1} \quad (16)$$

is what has been obtained through the linear transformation of the carry vector $$C_n, C_{n-1} \ldots C_1, C_0, C_{-n} \quad (17)$$

by the unimodular matrix mentioned in (5).

In addition, individual number $Z_i$ in each digit of the sum Z' in the constant-sum unimodular p-adic number of the Formula 15 is obtained from the following formula as $$Z'_i = X'_i + Y'_i + d'_{i-1} \text{ (Modulo } p\text{)} \quad (18)$$

which is similar to Formula 14.

That is to say, $Z'$ is the same as the sum $Z$ which was represented by the constant-sum unimodular p-adic system, and, consequently, $Z_i$ in the left side of the Formula 15 can be represented by $$Z_i = Z_n A_{i,n} + Z_{n-1} A_{i,n-1} + \ldots Z_0 A_{i,0} + Z_{-1} A_{i,-1} \quad (19)$$

by linear formation of Formula 5 incorporating $Z_n$, $Z_{n-1}$ ... $Z_1$, $Z_0$, and $A_{i,n}$, $A_{i,n-1}$ ... $A_{i,0}$, $A_{i,-1}$ If $Z_n$, $Z_{n-1}$ ... $Z_0$, $Z_{-1}$ which are obtained varying $i$ within the range between $n$ to $-1$ in the Formula 14 are substituted into Formula 19, a formula which represents a general term $$Z_i = (X_n + Y_n + C_{n-1})A_{i,n} + (X_{n-1} + Y_{n-1} + C_{-2})A_{i,n-1} \ldots + (X_0 + Y_0 + C_{n-1})A_{i,0} + (X_{-1} + Y_{-1} + C_{-2})A_{i,-1} \quad (20)$$

can be obtained.

If the Formula 20 is rearranged after multiplication of the numbers into the blankets, the following formula $$Z_i = (X_n A_{i,n} + X_{n-1} A_{i,n-1} + \ldots + X_0 A_{i,0} + X_{-1} A_{i,-1}) \\ + (Y_n A_{i,n} + Y_{n-1} A_{i,n-1} + \ldots Y_0 A_{i,0} + Y_{-1} A_{i,-1}) \\ + (C_n A_{i,n} + C_{n-1} A_{i,n-1} + \ldots + C_0 A_{i,0} + C_{-1} A_{i,-1}) \quad (21)$$

is established.

The three terms in parenthesis in formula (21) are equivalent to numbers $x_i$, $y_i$, in the respective $i_{th}$ digits in Formulas 9' and 10' which have been symbolized by converting the augend X and addend Y of Formulas 9 and 10, which were represented by the p-adic system indication into the constant-sum unimodular p-adic number system.

Further, the last parenthesis shows the component of the $i_{th}$ digit represented by the constant-sum unimodular p-adic number obtained from multiplication of the carry vector C represented by the p-adic number of the synthematic addition mentioned in Formula 13 and the unimodular matrix shown in the Formula 5. That is to say, respective parenthesis in the Formula 21 are individually equialent with $x_i$, $y_i$, $d_{n-1}$.

Thus, in order to construct an adding circuit of the constant-sum unimodular p-adic number according to the present invention, it is necessary to provide the adding circuit of modulo $p$ of the three inputs having either a spatial cyclic property or a temporal cyclic property or such another method in which a supplemental circuit uses the adding circuit modulo $p$ of the three inputs repeatedly. For executing the later method, the augends and the addends of the three inputs are applied at the state of the constant-sum unimodular p-adic indication and, at the same time, each component of the vector ($d_n$, $d_{n-1}$ ... $d_0$, $d_{-1}$) is applied by converting the carrying vector ($C_n$, $C_{n-1}$ ... $C_0$, $C_{-1}$) of the p-adic number by means of the unimodular matrix (5).

The aforementioned theory of the adding circuit is applicable to general number codes derived from the unimodular conversion having no constant-sums. In the case of generation of any erroneous operation in an adding circuit, the proposed detection of error can be executed by simple search of the constant-sum of the output since any constant-sum shown in Formula 8 will not be established due to the constant-sum unimodular p-acid number being employed therewith.

Further, if an indication system of the negative number by the principle of complement being utilized of the present adding circuit, a subtracting circuit can be easily constructed. And in order to expedite the operating speed, a circuit of high speed carry may be easily constructed.

Further, with use of the circuits such as shift circuit, multiplication table circuits and other supplemental circuits, there can be performed arithmetical operations (addition/subtraction/multiplication/division) which circuits can be also constructed by the use of conventional methods.

Thus, in order to construct a computing circuit capable of operating more complicated computations, the theory of the construction of the adding circuit in the present invention can be applied by means of an arrangement of the arithmetic operation. In addition, there is no necessity for supplementing any surplus circuit for executing the detection of error in the computing circuit.

Next, in the case $p=3$, namely in the case of 3-adic system, the embodiment of the present invention will be explained by actually using figures.

Let the given decimal numbers to 5 and 6. These numbers are 12 and 20 respectively if expressed according to the ordinary 3-adic system, because $5 = 1 \times 3 + 2 = 12$ and $6 = 2 \times 3 + 0 = 20$.

Now, we shall add a constant-sum digit to the right of the least significant digit of each of the above two ordinary 3-acid numbers. In the case of 3-adic system, any of the digits 0, 1 and 2 may be used, but in this example we shall use 0.

| Decimal number | 3-adic number | 3-adic number having a constant-sum digit attached |
|---|---|---|
| 5——→ | 12——→ | 120 (x) |
| 6——→ | 20——→ | 200 (y) |

Next, the 3-adic numbers to which constant-sum digits are attached are converted into zero-sum cyclic 3-adic numbers. This conversion is performed by circuits 3 and 3' of FIGS. 3 and 5 and explained by the Equation 6.

| 3-adic number having a constant sum digit attached | Zero-sum cyclic 3-adic number |
|---|---|
| 120 (x)——→ | 111 (x') |
| 200 (y)——→ | 210 (y') |

The above conversion is performed according to the following operation. The most significant digit is moved from column to the right, without giving any change, to form the most significant digit of the new number. Next, in the left column, subtract the most significant digit from the digit on its right and write the difference in the right column in the adjacent place less significant next to the most significant digit. If the difference is negative, add 3 to it (in the case of 3-adic numbers) and obtain an algebraic sum and write it in the above place.

For the rest of digits, conduct similar calculations. In the generalized form, subtract the next most significant digit from the digit in the place concerned of the 3-adic number to which a constant-sum digit is attached and write the difference in the corresponding position of the zero-sum cyclic 3-adic number. Repeat the process in order.

When illustrated by a diagram, the above-described process is as follows:

$$12 \; 0 \rightarrow (1, \; 2-1=1, \; 0-2+3=1) \rightarrow 111$$

Now, the constant-sum character of the constant-sum cyclic p-adic numbers which is a characteristic of the present invention should be clear. The constant-sum character refers to the fact that in the above example of constant-sum cyclic 3-adic numbers, if the sum of the digits of each number is divided by 3, the remainder is always the same figure as the constant-sum digit which was attached to the number. In the case of constant-sum cyclic p-adic numbers, the above 3 may be substituted by the digit $p$.

In this example, since the constant-sum digit is 0, the sum of the digits of the respective numbers can be divided by 3 without a remainder as demonstrated below.

$$1+1+1=3,\ 3\div3=1\ \ldots\ \text{no remainder}$$
$$2+1+0=3,\ 3\div3=1\ \ldots\ \text{no remainder}$$

The following will illustrate addition of the two decimal numbers of 5 and 6 in accordance with the conventional ternary system and the zero-sum cyclic 3-adic system, respectively. This fact will be further explained by circuits 5 of FIGS. 3 and 5 and FIG. 10D and Equation 15.

| Conventional 3-adic system with zero added | Zero-sum cyclic 3-adic system |
|---|---|
| 120 (x) ⟶ | 111 (x') |
| +200 (y) ⟶ | +210 (y') |
| 1000 (c) carry digits ⟶ | 1200 (d) cyclic carry digits c |
| 1020 | 1221 (z') |

Here, we must pay attention to the fact that the cyclic carry digits $d$ (1200) of the above zero-sum cyclic 3-adic number were converted to their existing form by the cyclic conversion vector of the corresponding ordinary 3-adic carry digits $c$ (100), and the cyclic sum ($z'$) of the digits of the number obtained as the result of addition (i.e., $x'+y'+d$) has the zero-sum property.

$$1+2+2+1=6$$

The reverse conversion of the zero-sum cyclic 3-adic number thus obtained into an ordinary 3-adic number is conducted by the circuit shown in FIG. 6 and explained by Equation 7.

Zero-sum cyclic 3-adic number ($z'$), 1221; 3-adic number having a constant-sum digit attached (i.e., 0), 1020; 3-adic number, 102; Decimal number, 11.

In the above, the constant-sum digit attached 3-adic number 1020 has been obtained from the zero-sum cyclic 3-adic number 1221 according to the following operations.

The most significant digit 1 which is in the 4th position is transferred without any change. For the 3rd position digit of the new 3-adic number, we shall obtain $1+2=0$ by adding the 4th and 3rd digits of the zero-sum cyclic 3-adic number. For the 2nd position digit of the new 3-adic number, we shall obtain $1+2+2=2$ by adding the 4th, 3rd and 2nd digits of the zero-sum cyclic 3-adic number. Similarly, the 1st position digit is the sum of all digits, that is, $1+2+2+1=0$.

As the constant-sum digit is determined to be 0 in the above example and further the sum of digits of zero-sum cyclic number 1221 obtained is 6 which is divisible by 3, it is verified that the operation has been conducted correctly by the constant-sum digit attached 3-adic numbers.

In the above example, explanation was made with 3-adic numbers, but operation can be conducted with numbers of any integer p-adic. Also, it is not always necessary to select the constant-sum digit to be 0, which constant-sum digit may be any digit less than $p-1$.

In this case, if the remainder obtained by dividing the sum of the digits of a number by p is the same as the constant-sum digit and, when the obtained value is converted into an ordinary p-adic number, if the least significant digit is the same as the constant-sum digit, it is evident that the operation has been conducted correctly.

In the constant-sum cyclic p-adic number, if, for example, 0 is used in its constant-sum digit, it is called "zero-sum cyclic p-adic number," and, therefore, if 2 is used in its constant-sum digit, it is called "2-sum cyclic p-adic number."

Accordingly, the present invention is directed to a conversion circuit and computing circuit for constant-sum cyclic p-adic numbers where errors in the adder circuit are contained in the sum obtained by incorporating operations for automatic verification, and therefore there is no need for an error detecting circuit (excepting such an adder circuit as shown in FIG. 2), as required by the prior art.

Returning now to the drawings, the present invention will be explained in detail.

Figure 3:
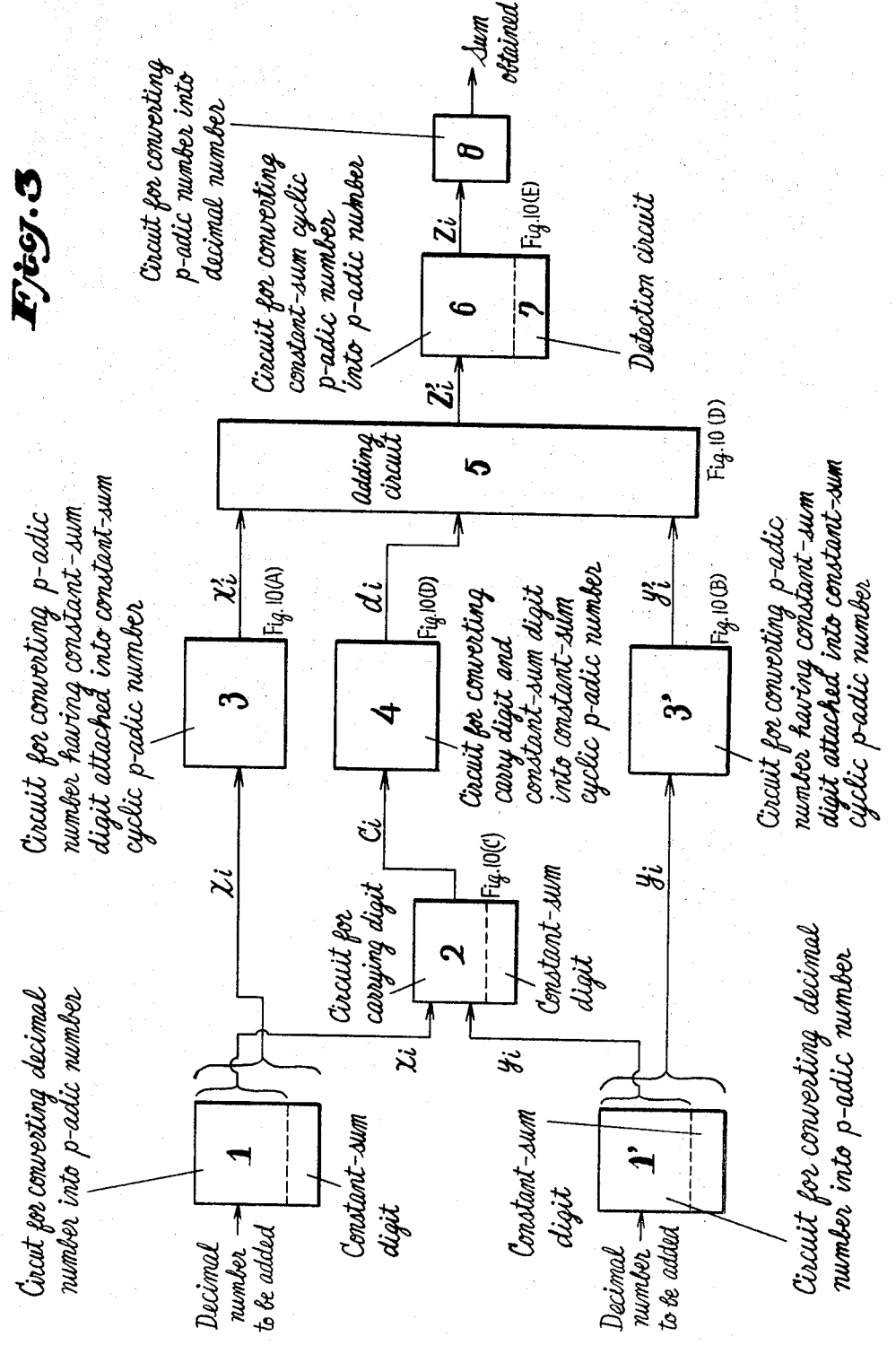
FIG. 3 is a block diagram of an embodiment of the overall system of the present invention.

FIG. 3 is a block diagram of the whole adder circuit of the present invention. The adder circuit of the present invention is constructed with circuits 1, 1' for converting an ordinary decimal number to a p-adic number, a computing circuit 2 for performing a carry of the p-adic number, circuits 3, 3' for converting a p-adic number to a constant-sum cyclic p-adic number, a circuit 4 for converting the carry number obtained from the circuit 2 to a constant-sum cyclic p-adic number, an adder circuit 5 used for the constant-sum cyclic p-adic numbers, a circuit 6 for converting the number obtained from circuit 5 back to an ordinary 3-adic number, a detection circuit 7 for detecting whether the number obtained is correct or not, and circuit 8 for converting the 3-adic number back to an ordinary decimal number.

Circuits 1, 1' used for converting an ordinary decimal number to a p-adic number and circuit 8 used for converting a p-adic number to an ordinary decimal number are publicly known.

The two numbers in the decimal system to be added are converted to their corresponding p-adic numbers ($x_i$, $y_i$) by publicly known conversion circuits 1, 1' and, after the constant-sum digit has been added, sent to circuits 3, 3'. After the p-adic numbers $x_i$, $y_i$ have been converted to constant-sum acyclic p-adic numbers ($x_i'$, $y_i'$) by circuits 3, 3' they are sent to adder circuit 5.

On the other hand, carry digit for the two numbers ($x_i$, $y_i$) converted to p-adic number is performed by circuit 2, and, after the constant-sum digit has been added, the carry digit (Ci) is converted to a consant-sum cyclic p-adic number ($d_i$) and sent to circuit 5.

The value ($Z_i'$) obtained by circuit 5 is converted back to an ordinary p-adic number ($Zi$) by circuit 6 and constant-sum digit is sent to circuit 7 as a checker where a check is made as to whether or not the calculation is correct.

The ordinary p-adic number ($Zi$) is converted to an ordinary decimal number by a conventional circuit, and the sum of the two numbers is obtained.

Figure 4:
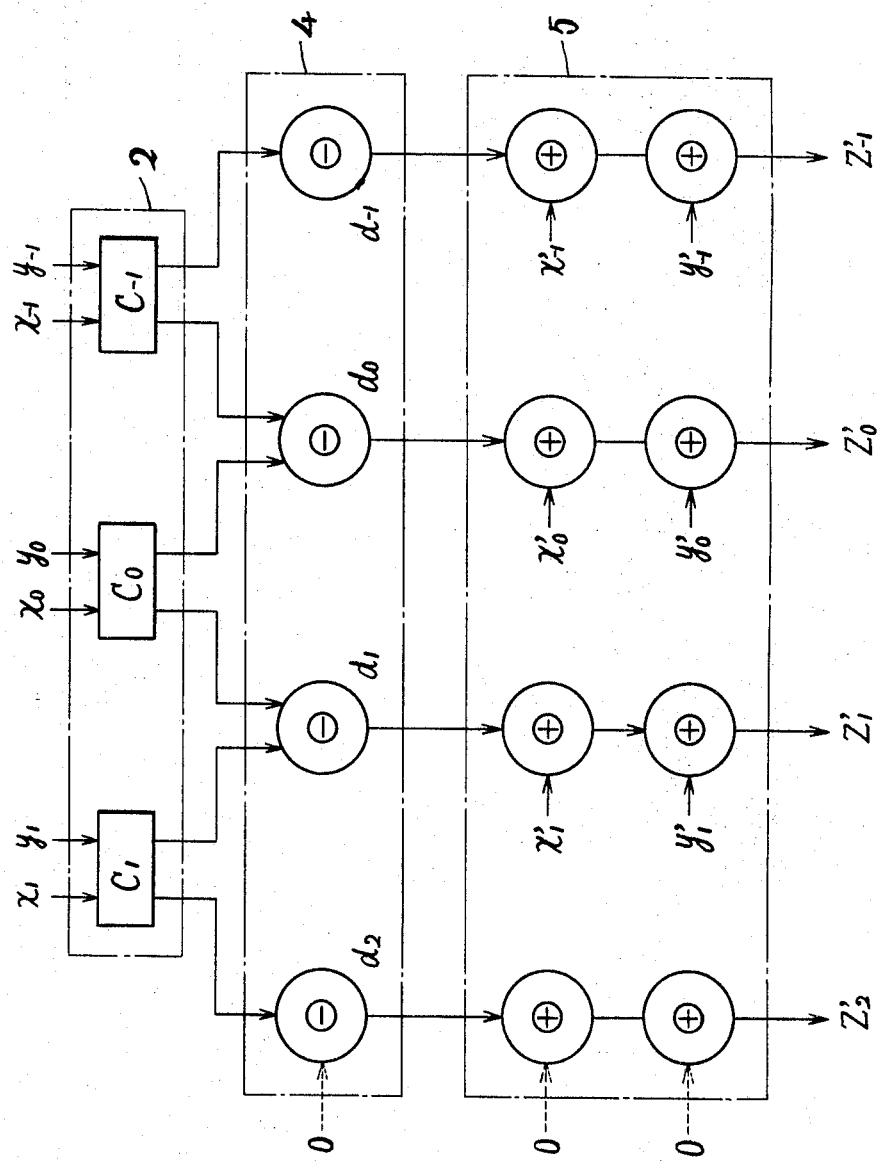
FIG. 4 is a similar diagram to FIG. 3, in which the present system is shown in more detail with symbolic circuit components.

FIG. 4 is a symbolic circuit of an embodiment of an adder circuit for adding two input constant-sum cyclic p-adic numbers each having three digits. Block circuits 2, 4 and 5 correspond to the block circuits 2, 4 and 5 in FIG. 3 respectively.

FIG. 5(A) is an embodiment of the conversion circuit in the parallel mode in which a p-adic number is converted into a constant-sum cyclic p-adic number and FIG. 5(B) is an embodiment of the conversion circuit in the serial mode of FIG. 5(A).

FIG. 6 is an embodiment of the circuit for converting a constant-sum cyclic p-adic number into a p-adic number.

FIG. 7 is an example of relay contact matrix in 3-adic system according to the present invention. The matrix is used to construct the block circuits in FIGS. 4, 5 and 6, that is, a 3-adic adder circuit, a circuit for converting constant-sum cyclic 3-adic number into a 3-adic number.

FIG. 8 shows an example of relay contact matrix in 5-adic system and, upon an application of this matrix to the block circuits in FIGS. 4, 5 and 6, a 5-adic adder circuit, a circuit for converting a 5-adic number into a constant-sum cyclic 5-adic number and a circuit for converting a constant-sum cyclic 5-adic number into a 5-adic number are obtained.

FIG. 9 is a detection circuit for checking whether or not the calculation is correct with constant-sum digit added in converting the constant-sum cyclic p-adic number back to p-adic number.

Figure 10:
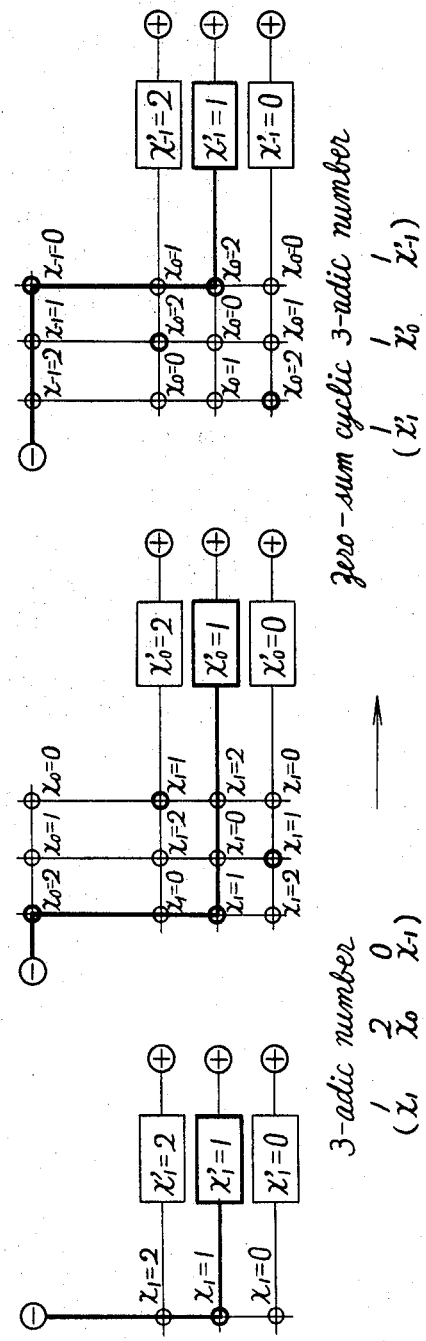
FIGS. 10(a)–10(e) show the overall circuit of the embodiment of FIG. 3, using contact matrix circuits of two digits in the 3-adic system.
Figure 10:
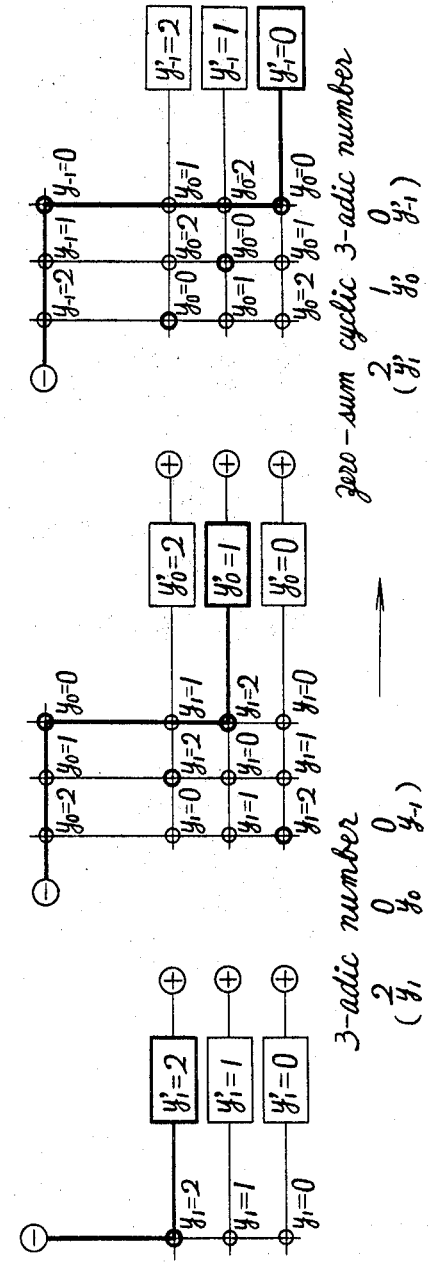

FIG. 10 is an example of the present whole system of FIG. 3, each of the block circuits being constructed with the contact matrix circuit of FIG. 7.

As an example, it is assumed that an addition of decimal numbers 5 and 6 is performed in the system of FIG. 10.

A 3-adic number 12 which is converted from the decimal number 5 by conventional decimal-ternary conversion circuit is added a constant-sum digit 0 at the right of the last significant digit 2, and thus a 3-adic number 120 is produced. The respective digits of the 3-adic number 120 are referred as $x_1$, $x_0$ and $x_{-1}$.

In FIG. 10(A), input contacts corresponding to the digit $x_1$ are closed by energizations of relays of conventional decimal-ternary conversion circuits and, in this case, the contact $x_1=1$ is closed thereby a relay $x_1'=1$ being energized to provide an output of $x_1'$ (the left circuit in FIG. 10(A)).

Upon the receipt of the next input digit 2, an input contact $x_0=2$ is closed, while contacts 1 of the contact matrix $x_1$ for the next digit are closed by the closure of the contact $x_1=1$ of the preceding stage, and accordingly, the relay $x_0$ is energized to provide an output $x_0'=1$. For the constant-sum digit 0, an input contact $x_{-1}=0$ of the third stage is closed, while contacts 2 of the third matrix are closed simultaneously with the closure of input contact of the second stage, and accordingly a relay $x'_{-1}$ is energized to provide an output $x'_{-1}$. Thus $x_{-1}=1$, $x'_1=1$ and $x'_1=1$ are obtained as outputs of the circuits of FIG. 10(A) which corresponds to the block circuit in FIG. 3 and the 111 represents the 3-adic number 120 in the present constant-sum cyclic 3-adic system.

Similarly, the respective digits of 200, which is obtained by converting the decimal number 6 to a 3-adic number 20 and adding a constant-sum digit 0 to the right of the last significant digit 0, energize contacts $y_1$, $y_0$ and $y_{-1}$ in FIG. 10(B) which corresponds to the block circuit 3' in FIG. 3. Consequently, relays $y'_1=2$, $y'_0=1$ and $y'_{-1}=0$ are energized and thus a zero-sum cyclic 3-adic number 210 is obtained.

On the other hand, the relay contacts $x_1=1$, $x_0=2$, $x_{-1}=0$, $y_1=2$, $y_0=0$ and $y_{-1}=0$ are closed correspondingly to the closure of the input contacts in FIGS. 10(A) and 10(B) thereby electric currents being flow along the thick solid lines as shown in FIG. 10(C) which corresponds to the block circuit 2 in FIG. 3 and consequently relays $C_2=1$, $C_1=0$ and $C_0=0$ are energized.

The contacts in a part enclosed by dotted line in FIG. 10(D) correspond to the block circuit 4 in FIG. 3. A carry digit of 3-adic number obtained from the matrix in FIG. 10(C) is converted to a constant-sum 3-adic number in the circuit in FIG. 10(D). This conversion is performed by closing certain contacts in FIG. 10(D) upon energization of the relays $C_2=1$, $C_1=0$ and $C_0=0$ in FIG. 10(C).

Thus, the respective digits of the converted constant-sum cyclic 3-adic number set the corresponding contacts enclosed by dotted line in FIG. 10(D) and at that time contacts $x'$ and $y'$ in FIG. 10(D) are closed correspondingly to the closure of the corresponding contacts in FIG. 10(A) and 10(B).

Consequently, electric currents are flown along the thick solid lines and thus relays $Z'_2=1$, $Z'_1=2$, $Z'_0=2$ and $Z'_{-1}=1$ are energized to provide an addition of two zero-sum cyclic 3-adic numbers 210 and 120.

In FIG. 10(E) which corresponds to the block circuit 6 in FIG. 3, relay contacts $Z'_2=1$, $Z'_1=2$, $Z'_0=2$ and $Z'_{-1}=1$ which correspond to the digits of $Z'$ obtained from FIG 10(D) are closed and thus $Z_2=1$, $Z_1=0$, and $Z_0=2$ are obtained through the closed contacts respectively.

The number 102 obtained in a 3-adic number and converted to a decimal number by the conventional conversion circuit for converting a 3-adic number into a decimal number thereby the number 11 being obtained as the sum of the two numbers 5, 6.

$Z_{-1}$ is a constant-sum digit added to detect an erroneous operation of the present system and in this case it is 1, so that the current is flown in the detection circuit enclosed by dotted line in FIG. 10(E) to the correct operation indicating terminal and indicates that the result of calculation is correct.

The above description has been mentioned for an explanatory purpose of the adding circuit, however, any computing circuit (addition/subtraction/multiplication/division) can be realized by basically utilizing such adding circuit. At the same time, the circuit still maintains the more advantageous feature of error detection.

Although it has embodied the parallel addition circuit of the three digital system, it is available to construct a serial adding circuit by utilizing a delay circuit.

Still another feature of the present method also allows the realization of various possibilities such as, for example, any finite positive integer other than 3 as a value of $p$ and any finite positive other than 3 as a value of being applicable.

Furthermore, various components (mechanical, electrical, electronical) other than electrical relay devices can be also applied to the present system. In the case of coding the p-adic numbers, any code system such as a 2-adic number system may also be available according to the present invention.

In short, according to the present invention, in the computing circuit of the information processing device, the weighted sum modulo $p$ of the respective digits of a number is made to have a constant value by means of applying number codes of the constant-sum cyclic p-adic system which was derived by the linear transformation on the integer modulo $p$ represented by the matrices on the p-adic number to which is added 1 or many digits equal to the constant value other than the respective digits of the ordinary representation of the p-adic number. Accordingly, a number code of the ordinary p-adic number is converted by the conversion circuit which was merely constructed by an addition and subtraction circuit modulo $p$ in which spatial and temporal cyclic characteristics are utilized together with another circuit of the multiplication table.

In this sense, the proposed conversion circuit and computing circuit including subtraction, multiplication and division incorporated with the theory of complement, circuit of multiplication table and division incorporated with the theory of complement, circuit of multiplication table and shift circuit are constructed with the knowledge of the adder of 2 numbers which are represented by the constant-sum cyclic p-adic number producing answers represented by the same cyclic p-adic number system, and the $i_{th}$ digit of the sum is made equivalent with the sum modulo $p$ of the three digits of the $i_{th}$ digits augend and the addend together with the carry from the $i_{th}$ digits.

According to the present invention, various kinds of number codes including the p-adic number can be selectively applied depending upon the purpose of computing so that construction of any proposed circuit based on any number code is available, however, only computing devices using 2-adic number or 10-adic number system have heretofore been applied.

In addition, according to the present invention, supplemental circuits for detecting erroneous operation in the prior art apparatus are not necessary any more. Consequently, the construction of the device of the present invention is remarkably simplified and together having further features of simplicity of detecting a computing operation as well as having the best reliability.

Accordingly, the calculating circuits according to the present invention should be widely utilized in the industrial field and particularly for manufacturers and users of information processing devices, measuring devices, regulating devices, etc. including electronic computing machines.

I claim:

1. An addition/subtraction/multiplication/division circuit comprising:

means for converting two numbers of decimal system to be computed into ordinary p-adic numbers, respectively, means for converting said ordinary p-adic numbers into constant-sum cyclic p-adic numbers, respectively, after attaching constant-sum digits to each of said ordinary p-adic numbers, means for computing using said constant-sum cyclic p-adic numbers to obtain a computed constant-sum cyclic p-adic number, means for detecting whether computation is conducted correctly by verifying whether the sum of the digits of said computed constant-sum cyclic number corresponds to said constant-sum digits attached, means for converting said computed constant-sum cyclic p-adic number into its corresponding ordinary p-adic number, means for converting said correspondingly ordinary p-adic number into its corresponding decimal number.

2. The circuit, as set forth in claim 1, wherein said constant-sum digits to be attached are less than the p-adic number to be used.

3. The circuit, as set forth in claim 1, wherein said mean for detecting comprises:

means for conducting detection while converting said computed constant-sum cyclic p-adic number into ordinary p-adic number.

4. The circuit, as set forth in claim 1, wherein:

said means for detecting comprises means for adding the digits of said computed constant-sum cyclic p-adic number and then dividing the result by the p-adic number to determine if the remainder is the same as said constant-sum number attached.

5. The circuit, as set forth in claim 1, further comprising:

means for computing a cyclic p-adic carry number from the carry digits of a sum of said ordinary p-adic numbers, and said means for computing said computed constant-sum cyclic p-adic number adds said constant-sum cyclic p-adic numbers and said cyclic p-adic carry number.

References Cited

UNITED STATES PATENTS 3,436,755   4/1969   Tolman _____ 340—347

FOREIGN PATENTS 1,187,831   2/1965   Germany.

MALCOLM A. MORRISON, Primary Examiner

R. S. DILDINE, Jr., Assistant Examiner

U.S. Cl. X.R.

340—347